United States Patent
Fujita et al.

(10) Patent No.: US 6,407,146 B1
(45) Date of Patent: Jun. 18, 2002

(54) CURABLE COMPOSITION

(75) Inventors: Masayuki Fujita; Yoshiki Nakagawa, both of Kobe; Masato Kusakabe, Takasago, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/463,623

(22) PCT Filed: Jul. 28, 1998

(86) PCT No.: PCT/JP98/03356

§ 371 (c)(1),
(2), (4) Date: Apr. 27, 2000

(87) PCT Pub. No.: WO99/05216

PCT Pub. Date: Feb. 4, 1999

(30) Foreign Application Priority Data

Jul. 28, 1997 (JP) ............................. 9/201108
Jul. 28, 1997 (JP) ............................. 9/201109

(51) Int. Cl.$^7$ ...................... C08F 2/42; C08L 57/06; C08L 63/00; C08L 71/00; C09K 3/10
(52) U.S. Cl. ................. 522/99; 522/100; 522/111; 522/122; 522/134; 522/143; 522/148; 522/172; 526/273; 528/33
(58) Field of Search .................... 522/99, 148, 111, 522/129, 100, 134, 143, 172, 122; 526/263; 528/33

(56) References Cited

U.S. PATENT DOCUMENTS 4,657,986 A * 4/1987 Isayama et al. ............... 525/40
5,973,068 A * 10/1999 Yamaya et al. ............. 524/856

FOREIGN PATENT DOCUMENTS

| EP | 0 659 854 A1 | 6/1995 |
| EP | 0 841 355 A2 * | 5/1999 |
| JP | 02-214759 | 8/1990 |

* cited by examiner

Primary Examiner—James J. Seidleck
Assistant Examiner—Sanza L. McClendon
(74) Attorney, Agent, or Firm—Connolly Bove Lodge & Hutz

(57) ABSTRACT

A curable composition which comprises the following two components: (I) a vinyl polymer having at least one crosslinkable silyl group represented by the general formula (1) given below, and (II) an epoxy resin or a polyether polymer having at least one crosslinkable silyl group;

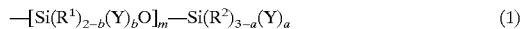

$$-[Si(R^1)_{2-b}(Y)_bO]_m-Si(R^2)_{3-a}(Y)_a \qquad (1)$$

{wherein $R^1$ and $R^2$ each represents an alkyl group containing 1 to 20 carbon atoms, an aryl group containing 6 to 20 carbon atoms, an aralkyl group containing 7 to 20 carbon atoms, or a triorganosiloxy group represented by the formula $(R')_3SiO$— (in which R' represents a monovalent hydrocarbon group containing 1 to 20 carbon atoms and the three R's may be the same or different) and, when there are two or more $R^1$ or $R^2$ groups, they may be the same or different; Y represents a hydroxy group or a hydrolyzable group and, when there are two or more Y groups, they may be the same or different; a represents 0, 1, 2 or 3; b represents 0, 1 or 2; and m represents an integer of 0 to 19; with the condition that a, b and m satisfy the relation a+mb≧1}.

15 Claims, No Drawings

CURABLE COMPOSITION

TECHNICAL FIELD

The present invention relates to a curable composition modified with a vinyl polymer having at least one crosslinkable silyl group. More particularly, it relates to a curable composition which when blended with an epoxy resin, gives a composition capable of firmly adhering to various substrates and showing elastic properties after curing and useful, in particular, as an elastic adhesive and to a curable composition which when blended with a polyether polymer having at least one crosslinkable silyl group, gives a composition showing, after curing, a high elongation and good weathering resistance.

BACKGROUND ART

Epoxy resin-based adhesives are widely used in various fields of industry, for example in automobile, vehicle, airplane, ship building, electronics, building and civil engineering industries, owing to those reliable bond strength and durability characteristics which they show when applied to a wide variety of materials such as metals, plastics, wood, glass, ceramics, stone and concrete.

However, cured products thereof are generally high in modulus of elasticity and low in energy absorbing ability and therefore possess the drawback of being hard and brittle. Therefore, problems still exist in adhesion of materials greatly differing in coefficient of linear expansion or adhesion of building materials or like members subject to repeated displacements owing to heat cycles. For solving these problems, the so-called modified silicone-based elastic adhesives have become widely used which are blends of an epoxy resin and a polyether polymer having at least one crosslinkable silyl group.

Such polyether polymers having at least one crosslinkable silyl group are disclosed, among others, in Japanese Kokoku Publications Sho-45-36319, Sho-46-12154, Sho-46-30741 and Sho-49-32673; Japanese Kokai Publications Sho-50-156599, Sho-51-73561, Sho-54-6096, Sho-55-13767, Sho-55-13768, Sho-55-82123, Sho-55-123620, Sho-55-125121, Sho-55-131021, Sho-55-131022, Sho-55-135135, Sho-55-137129, Hei-03-72527 and Hei-03-97825. When cured, such polymers give cured products showing high elongation and are used mainly in elastic sealing compositions for architectural use, among others. However, these polyethers, in particular polyethers whose main chain is a polypropylene oxide, have a problem: without the use of an antioxidant, the hydrogen atom bound to a tertiary carbon atom is susceptible to oxidation, by which the weathering resistance is weakened. To solve this problem, the present inventors have already proposed in Japanese Kokoku Publication Hei-02-42367 and Japanese Kokoku Publication Hei-02-44845 curable compositions improved in weathering resistance which comprise a polyether polymer having at least one crosslinkable silyl group as blended with an acrylic polymer having at least one crosslinkable silyl group. Further, in Japanese Kokoku Publication Hei-04-69667, there is disclosed a sealing composition comprising a blend of an acrylic polymer having an alkoxysilyl group at both molecular termini and a polyether polymer having an alkoxysilyl group at both molecular termini.

However, the elastic adhesives mentioned above which comprise a blend of an epoxy resin and a polyether polymer have various problems. First, the epoxy resin and the crosslinkable silyl-containing polyether polymer are poor in compatibility. Thus, while it is generally possible to obtain a soft elastomer having a structure such that an epoxy resin is finely dispersed in the matrix of a polyether polymer, a hard type elastomer in which a polyether polymer is conversely dispersed in an epoxy resin matrix cannot be obtained. In addition, it is generally impossible to use the polyether polymer, which has a tertiary hydrogen atom in its main chain structure, in those fields in which weathering resistance and heat resistance are required.

To solve these problems, an epoxy-polyether-(meth) acrylic ternary system has been proposed in which a crosslinkable silyl-containing (meth)acrylic polymer having good weathering resistance and good compatibility with the epoxy resin is blended as a third component (Japanese Kokai Publication Hei-02-214759). However, the (meth)acrylic polymer used therein is a polymer synthesized by free radical polymerization and, therefore, has a wide molecular weight distribution and a high viscosity, so that the mixture thereof with an epoxy resin also has a high viscosity. Another problem is that since it is impossible to attain a high degree of crosslinkable silyl group introduction, the elastic properties once obtained are damaged by blending of a polyether polymer.

Accordingly, the present invention has for its object to provide a curable composition having low viscosity and capable of providing a wide variety of rigid and non-rigid elastomers having no more hard and brittle properties and improved in weathering resistance level while maintaining the adhesion strength of the epoxy resin.

The vinyl polymer having at least one crosslinkable silyl group, which is to be blended with a polyether polymer having at least one crosslinkable silyl group, is generally produced by using a crosslinkable silyl-containing radical initiator or chain transfer agent. Therefore, there is a problem that it is difficult to introduce a crosslinkable silyl group at both termini at a high rate and, therefore, the cured products tend to have a low gel fraction. For obtaining cured products with a sufficient gel fraction, it is necessary to combinedly use a crosslinkable silyl-containing monomer. In that case, however, there is the problem that the high elongation characteristics intrinsic in polyether polymers are damaged. In particular, the elongation at break becomes decreased, so that the range of use of the resulting composition is considerably restricted. Thus, for improving the weathering resistance of such composition for use as a sealing material, some physical properties must be sacrificed, resulting in an increased modulus, decreased elongation, worsened residual tack or lowered gel fraction. There is a further problem that the molecular weight distribution is broad and the polymer has a high viscosity because of the use of free radical polymerization.

In the art, it is not easy to produce a vinyl polymer having at least one crosslinkable silyl group with a high degree of crosslinkable silyl group introduction. The present invention is to provide a curable composition having a high gel fraction and good weathering resistance without impairing the high elongation and other properties intrinsic in crosslinkable silyl-containing polyether polymers by using a vinyl polymer having a low viscosity and a high degree of crosslinkable silyl group introduction.

It was found that the above problems can be solved when a curable composition comprises, as essential components, a vinyl polymer having at least one crosslinkable silyl group and an epoxy resin or a polyether polymer having at least one crosslinkable silyl group. This finding has now led to completion of the present invention.

SUMMARY OF THE INVENTION

The present invention provides a curable composition which comprises the following two components: (I) a vinyl polymer having at least one crosslinkable silyl group represented by the general formula (1) given below, and (II) an epoxy resin or a polyether polymer having at least one crosslinkable silyl group;

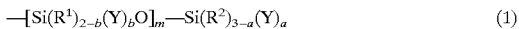
$$-[Si(R^1)_{2-b}(Y)_bO]_m-Si(R^2)_{3-a}(Y)_a \quad (1)$$

wherein $R^1$ and $R^2$ each represents an alkyl group containing 1 to 20 carbon atoms, an aryl group containing 6 to 20 carbon atoms, an aralkyl group containing 7 to 20 carbon atoms, or a triorganosiloxy group represented by the formula $(R')_3SiO-$, in which R' represents, a monovalent hydrocarbon group containing 1 to 20 carbon atoms and the three R's may be the same or different, and when there are two or more $R^1$ or $R^2$ groups, they may be the same or different; Y represents a hydroxy group or a hydrolyzable group and, when there are two or more Y groups, they may be the same or different; a represents 0, 1, 2 or 3; b represents 0, 1 or 2; and m represents an integer of 0 to 19; with the condition that a, b and m satisfy the relation $a+mb \geq 1$.

DETAILED DESCRIPTION OF THE INVENTION

The vinyl polymer to be used as component (I) according to the present invention has at least one crosslinkable silyl group represented by the following general formula (1):

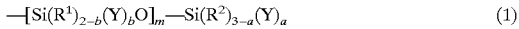
$$-[Si(R^1)_{2-b}(Y)_bO]_m-Si(R^2)_{3-a}(Y)_a \quad (1)$$

{wherein $R^1$ and $R^2$ each represents an alkyl group containing 1 to 20 carbon atoms, an aryl group containing 6 to 20 carbon atoms, an aralkyl group containing 7 to 20 carbon atoms, or a triorganosiloxy group represented by the formula $(R')_3SiO-$ (in which R' represents a monovalent hydrocarbon group containing 1 to 20 carbon atoms and the three R's may be the same or different) and, when there are two or more $R^1$ or $R^2$ groups, they may be the same or different; Y represents a hydroxy group or a hydrolyzable group and, when there are two or more Y groups, they may be the same or different; a represents 0, 1, 2 or 3; b represents 0, 1 or 2; and m represents an integer of 0 to 19; with the condition that a, b and m satisfy the relation $a+mb \geq 1$}.

Said hydrolyzable group represented by Y is not particularly restricted but includes, among others, those which are known in the art, specifically a hydrogen, a halogen atom and alkoxy, acyloxy, ketoximato, amino, amido, aminoxy, mercapto, alkenyloxy and like groups. Among them, alkoxy groups are preferred because of mild hydrolyzability and easiness of handling. Said hydrolyzable and/or hydroxy groups may be bound to a silicon atom within the range of 1 to 3 and the total sum of hydrolyzable groups, namely a+mb, is preferably within the range of 1 to 5. In cases where two or more hydrolyzable and/or hydroxy groups exist in one crosslinkable silyl group, they may be the same or different. The number of silicon atoms constituting a crosslinkable silyl group may amount to one or more and, in the case of silicon atoms joined together via siloxane bonding, the number of silicon atoms may amount up to about 20.

The monomer to constitute the main chain of the vinyl polymer having at least one crosslinkable silyl group of the general formula (1) is not particularly restricted but may be any of various monomers. The vinyl monomer to be used in producing the main chain of the vinyl polymer of the present invention is not particularly restricted but includes various monomers. Examples are (meth)acrylic monomers such as (meth)acrylic acid, methyl (meth)acrylate, ethyl (meth) acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth) acrylate, cyclohexyl (meth)acrylate, n-heptyl (meth) acrylate, n-octyl (meth)acrylate, 2-ethylhexyl (meth) acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth) acrylate, stearyl (meth)acrylate, glycidyl (meth)acrylate, 2-aminoethyl (meth)acrylate, γ-(methacryloyloxypropyl) trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth) acrylate, 2-perfluoromethyl-2-perfluoroethylmethyl (meth) acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so on. These may be used singly or a plurality of them may be used for copolymerization. In the above context, "(meth)acrylic acid", for instance, means acrylic acid and/or methacrylic acid.

Preferred as the vinyl polymer having at least one crosslinkable silyl group represented by the general formula (1) from the physical properties viewpoint are (meth)acrylic polymers obtained by polymerizing using not less than 40% by weight of a (meth)acrylic monomer among the vinyl monomers mentioned above.

The molecular weight of said vinyl polymer having at least one crosslinkable silyl group is not particularly restricted but is preferably within the range of 500 to 100,000. When the molecular weight is below 500, the characteristics intrinsic in the vinyl polymer are hardly expressed. A molecular weight above 100,000 makes handling difficult.

The molecular weight distribution, namely the ratio (Mw/Mn) of weight average molecular weight (Mw) to number average molecular weight (Mn) as determined by gel permeation chromatography, of said vinyl polymer having at least one crosslinkable silyl group is not particularly restricted but, for suppressing the viscosity of the adhesive curable composition prepared by using said polymer to thereby facilitate handling of said composition and for obtaining cured products having sufficient physical properties, a narrow molecular weight distribution is preferred. Preferred is a molecular weight distribution value of less than 1.8, more preferably not more than 1.7, still more preferably not more than 1.6, still more preferably not more than 1.5, in particular not more than 1.4, most preferably not more than 1.3.

Said vinyl polymer having at least one crosslinkable silyl group can be synthesized by various methods and the methods are not particularly restricted. From the viewpoint of versatility concerning monomers and easiness of control, however, the method comprising directly introducing a crosslinkable silyl group by radical polymerization and the method comprising obtaining a vinyl polymer having a specific functional group convertible to a crosslinkable silyl group by one to several reaction steps and then converting said specific functional group to a crosslinkable silyl group to thereby obtain a vinyl polymer having at least one crosslinkable silyl group are preferred.

The methods of producing the vinyl polymer having a specific functional group, inclusive of a crosslinkable silyl group, by radical polymerization may be classified into two groups; one is "ordinary radical polymerization" in which a monomer having a specific functional group are merely copolymerized in polymerizing a vinyl monomer by using an azo compound or a peroxide, for instance, as the polymerization initiator and the other is "controlled radical polymerization" by which a specific functional group is introduced into the polymer at controlled sites, for example at terminal sites.

"Controlled radical polymerization" methods can be classified: one is "chain transfer agent method" which comprises using a chain transfer agent having a specific functional group to thereby obtain a functional group-terminated vinyl polymer, and the other is "living radical polymerization method" in which the polymerization proceeds without the initiator terminal undergoing a termination reaction or the like to give a polymer having a molecular weight substantially as designed.

"Ordinary radical polymerization" is simple and easy to perform and may also be employed in the practice of the present invention. However, the monomer having a specific functional group can be introduced into the polymer only in a random manner. When a polymer with a high degree of functionalization is to be obtained, it is necessary to use said monomer in a considerably large amount. When, conversely, the amount of said monomer is small, the problem arises that the proportion of polymers in which said specific functional group has not been introduced is increases, although a polymer having a specific functional group can be obtained.

The "chain transfer agent method" can give a polymer with a high degree of functionalization and may also be used in the practice of the present invention. However, said method requires a fairly large amount of a chain transfer agent having a specific functional group as compared with the initiator and raises economical problems, inclusive of a treatment-related problem. Like the above ordinary radical polymerization method, this method has further problems; namely it gives only a high viscosity polymer with a wide molecular weight distribution.

While the term "living polymerization", in its narrower sense, means polymerization in which molecular chains grow while the termini thereof always retain their activity, said term generally includes, within the meaning thereof, quasi-living polymerization in which terminally inactivated molecules and terminally active molecules grow in a state of equilibrium. The latter definition applies to the living polymerization to be employed in the practice of the present invention. Such "living radical polymerization" has recently been studied actively by various groups of researchers. As examples, there may be mentioned, among others, the use of a cobalt-porphyrin complex as described in J. Am. Chem. Soc., 1994, vol. 116, pages 7943 ff., the use of a radical capping agent such as a nitroxide compound as described in Macromolecules, 1994, vol. 27, pages 7228 ff., and the technique of "atom transfer radical polymerization (ATRP)" which uses an organic halide or the like as the initiator and a transition metal complex as the catalyst. In spite of the fact that it involves radical polymerization which proceeds at a high rate of polymerization and is susceptible to termination as a result of radical-to-radical coupling and thus is said to be difficult to control, living radical polymerization hardly undergoes termination reactions and gives a polymer with a narrow molecular weight distribution (Mw/Mn=1.1 to 1.5), and the molecular weight can be freely controlled by varying the charging ratio between the monomer(s) and initiator.

"Living radical polymerization" intrinsically can give a low-viscosity polymer with a narrow molecular weight distribution and, furthermore, makes it possible to introduce a monomer having a specific functional group into a polymer in almost arbitrary positions and, therefore, is preferred as a method of producing a vinyl polymer having a specific functional group.

Among the "living radical polymerization" techniques, the "atom transfer radical polymerization" technique, which uses an organic halide or halogenated sulfonyl compound as an initiator and a transition metal complex as a catalyst for polymerizing vinyl monomers, has, in addition to the above-mentioned advantageous features of "living radical polymerization", advantages in that it gives a polymer having a halogen or the like, which is relatively advantageous for functional group conversion, at the termini and that the degree of freedom in initiator and catalyst designing is great and, therefore, is more preferred as the method of producing a specific functional group-containing vinyl polymer. This atom transfer radical polymerization is described, for example, by Matyjaszewski et al. in J. Am. Chem. Soc., 1995, vol. 117, pages 5614 ff.; Macromolecules, 1995, vol.28, pages 7901 ff.; Science, 1996, vol. 272, pages 866 ff.; WO 96/30421 and WO 97/18247, and by Sawamoto et al. in Macromolecules, 1995, vol. 28, pages 1721 ff.

In said atom transfer radical polymerization, an organic halide, in particular an organic halide having a highly reactive carbon-halogen bond (for example, a carbonyl compound having a halogen at a position or a compound having a halogen at benzyl position) or a halogenated sulfonyl compound is used as the initiator.

Usable as the transition metal complex, which is to be used as the catalyst in said atom transfer radical polymerization, are complexes containing an element of the group 7, 8, 9, 10 or 11 of the periodic table as the central metal. As preferred examples, there may be mentioned complexes of copper having a valency of 0 (zero), monovalent copper, divalent ruthenium, divalent iron or divalent nickel. Among them, copper complexes are preferred. Specific examples of monovalent copper compounds are cuprous chloride, cuprous bromide, cuprous iodide, cuprous cyanide, cuprous oxide and cuprous perchlorate. When such a copper compound is used, a ligand, such as 2,2'-bipyridyl or a derivative thereof, 1,10-phenanthroline or a derivative thereof, tetramethylethylenediamine, pentamethyldiethylenetriamine, hexamethyltris(2-aminoethyl)amine or a like polyamine, is added for increasing the catalytic activity. The tristriphenylphosphine complex of divalent ruthenium chloride ($RuCl_2(PPh_3)_3$) is also suited for use as the catalyst. When a ruthenium compound is used as the catalyst, an aluminum alkoxide is added as an activator. Further, the bistriphenylphosphine complex of divalent iron (FeCl$_2$(PPh$_3$)$_2$), bistriphenylphosphine complex of divalent nickel (NiCl$_2$(PPh$_3$)$_2$) and bistributylphosphine complex of divalent nickel (NiBr$_2$(PBu$_3$)$_2$) are also suitable as the catalyst.

The vinyl monomer(s) to be used in said polymerization are not particularly restricted but those already mentioned hereinabove may judiciously be used.

The above polymerization reaction can be carried out in the absence or presence of a solvent. As the solvents, there may be mentioned, among others, hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate. These may be used singly or two or more of them may be used combinedly. The above polymerization can be carried out within the temperature range of 0 to 200° C, preferably within the range from room temperature to 150° C.

The vinyl polymer having at least one crosslinkable silyl group represented by the general formula (1) can be obtained by utilizing the methods mentioned below by way of example, which, however, have no limitative meaning.

As the method of synthesizing the vinyl polymer having at least one crosslinkable silyl group, there may be mentioned: (A) Method comprising subjecting a vinyl polymer having at least one alkenyl group to addition reaction with a crosslinkable silyl-containing hydrosilane compound in the presence of a hydrosilylation catalyst; (B) Method comprising reacting a vinyl polymer having at least one hydroxy group with a compound having, in one molecule, a crosslinkable silyl group and a group capable of reacting with a hydroxy group, for example an isocyanato group; (C) Method comprising subjecting a compound having, in one molecule, a polymerizable alkenyl group and a crosslinkable silyl group to reaction in the step of synthesizing a vinyl polymer by radical polymerization; (D) Method comprising using a crosslinkable silyl-containing chain transfer agent in carrying out radical polymerization for synthesizing a vinyl polymer; (E) Method comprising reacting a vinyl polymer having at least one highly reactive carbon-halogen bond with a compound having, in one molecule, a crosslinkable silyl group and a stable carbanion.

The vinyl polymer having at least one alkenyl group, which is to be used in the method (A), can be obtained by various methods. Several methods are mentioned below but they have no limitative meaning.

(A-a) Method comprising subjecting a compound having a polymerizable alkenyl group and an alkenyl group having low polymerizability in one molecule, such as a compound represented by the general formula (2) shown below, to reaction, as a second monomer, in the step of synthesizing a vinyl polymer by radical polymerization:

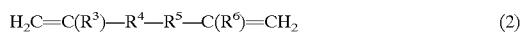

(wherein R$^3$ represents a hydrogen atom or a methyl group; R$^4$ represents —C(O)O— or an o-, m- or p-phenylene group; R$^5$ represents a direct bond or a divalent organic group containing 1 to 20 carbon atoms, which may option-ally contain one or more ether bonds; and R$^6$ represents a hydrogen atom, an alkyl group containing 1 to 10 carbon atoms, an aryl group containing 6 to 10 carbon atoms or an aralkyl group containing 7 to 10 carbon atoms).

The time for submitting the compound having a polymerizable alkenyl group and an alkenyl group having low polymerizability in one molecule to reaction is not restricted but, particularly when rubber-like properties are expected to the polymer to be obtained by living radical polymerization, it is preferred that said compound be subjected to reaction as a second monomer at the final stage of polymerization or after completion of the reaction of the predetermined monomer(s).

(A-b) Method comprising subjecting a compound having at least two alkenyl groups having low polymerizability, such as 1,5-hexadiene, 1,7-octadiene or 1,9-decadiene, to reaction at the final stage of polymerization or after completion of the reaction of the predetermined monomer(s) in synthesizing a vinyl polymer by living radical polymerization.

(A-c) Method comprising reacting a vinyl polymer having at least one highly reactive carbon-halogen bond with an alkenyl-containing organometallic compound, typically allyltributyltin, allyltrioctyltin or like organotin compound, to thereby substitute an alkenyl-containing group for the halogen.

(A-d) Method comprising reacting a vinyl polymer having at least one highly reactive carbon-halogen bond with an alkenyl-containing stabilized carbanion, such as one represented by the general formula (3), to thereby substitute an alkenyl-containing group for the halogen:

(wherein R$^6$ is as defined above; R$^7$ and R$^8$ each represents an electron-withdrawing group serving to stabilize the carbanion C— or one of them represents such electron-withdrawing group and the other represents a hydrogen atom, an alkyl group containing 1 to 10 carbon atoms or a phenyl group; R$^9$ represents a direct bond or a divalent organic group containing 1 to 10 carbon atoms, which may optionally contain one or more ether bonds; and M$^+$ represents an alkali metal ion or a quaternary ammonium ion).

Preferred as the electron-withdrawing group represented by R$^7$ and/or R$^8$ are those having the structure of —CO$_2$R, —C(O)R or —CN.

(A-e) Method comprising preparing an enolate anion by reacting a vinyl polymer having at least one highly reactive carbon-halogen bond with an elementary metal, such as zinc, or an organometallic compound and then reacting the enolate anion with an alkenyl-containing electrophilic compound, such as an alkenyl-containing compound having a leaving group such as a halogen atom and an acetyl group, an alkenyl-containing carbonyl compound, an alkenyl-containing isocyanate compound and an alkenyl-containing acid halide compound.

(A-f) Method comprising reacting a vinyl polymer having at least one highly reactive carbon-halogen bond with an oxy anion or carboxylate anion having an alkenyl group, and one represented by the general formula (4) shown below, and one represented by the general formula (5) shown below, to; thereby substitute the halogen:

(wherein R$^6$ and M$^+$ are as defined above and R$^{11}$ represents a divalent organic group containing 1 to 20 carbon atoms, which may optionally contain one or more ether bonds);

(wherein $R^6$ and $M^+$ are as defined above and $R^1$ represents a direct bond or a divalent organic group containing 1 to 20 carbon atoms, which may optionally contain one or more ether bonds).

The above-mentioned vinyl polymer having at least one highly reactive carbon-halogen bond can be synthesized, for example, by the following methods, which have no limitative meaning, however:

(E-a) Method using a halide, such as carbon tetrachloride, ethylene chloride, carbon tetrabromide or methylene bromide, as a chain transfer agent in radical polymerization, as shown in Japanese Kokai Publication Hei-04-132706 (chain transfer agent method); and (E-b) Method involving atom transfer radical polymerization and using an organic halide such as mentioned above as an initiator and a transition metal complex as a catalyst.

The vinyl polymer having at least one alkenyl group can be obtained also from the corresponding vinyl polymer having at least one hydroxy group. The specific method therefor is not particularly restricted but includes, among others, the following methods:

(A-g) Method comprising reacting a vinyl polymer having at least one hydroxy group with a base such as sodium methoxide and then reacting the resulting polymer with an alkenyl-containing halide such as allyl chloride.

(A-h) Method comprising reacting the vinyl polymer with an alkenyl-containing isocyanate compound such as allyl isocyanate.

(A-i) Method comprising reacting the vinyl polymer with an alkenyl-containing acid halide, such as (meth)acryloyl chloride, in the presence of a base such as pyridine.

(A-j) Method comprising reacting the vinyl polymer with an alkenyl-containing carboxylic acid, such as acrylic acid, in the presence of an acid catalyst.

In the present invention, when no halogen atom is directly involved in alkenyl group introduction, as in the case of the above methods (A-a) and (A-b), the use of living radical polymerization is preferred for synthesizing the vinyl polymer and, in that case, the method (A-b) is more preferred because of easiness of control.

When alkenyl group introduction is effected by conversion of the halogen of a vinyl polymer having at least one highly reactive carbon-halogen bond, the use of a vinyl polymer having at least one highly reactive terminal carbon-halogen bond, which can be prepared by radical polymerization (atom transfer radical polymerization) of a vinyl monomer using an organic halide or halogenated sulfonyl compound having at least one highly reactive carbon-halogen bond as the initiator and a transition metal complex as the catalyst is preferred. In that case, the method (A-f) is more preferred because of easier control.

The crosslinkable silyl-containing hydrosilane compound is not particularly restricted but includes, typically, compounds represented by the general formula (6):

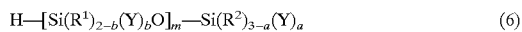

(wherein $R^1$, $R^2$, a, b, m and Y are as defined above).

Among these hydrosilane compounds, compounds having a crosslinkable group represented by the general formula (7) are particularly preferred because of ready availability:

(wherein $R^2$, Y and a are as defined above).

In causing the above crosslinkable silyl-containing hydrosilane compound to add to the alkenyl group, a transition metal catalyst is generally used. Said transition metal catalyst includes, among others, elementary platinum; solid platinum dispersed and supported on a carrier such as alumina, silica or carbon black; chloroplatinic acid; complexes of chloroplatinic acid with an alcohol, aldehyde, ketone or the like; platinum-olefin complexes and platinum (O)-divinyltetramethyldisiloxane complex. As examples of the catalyst other than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$.

As the method of synthesizing the vinyl polymer having at least one hydroxy group, which is to be used in the above synthetic method (B) or in any of the methods (A-g) to (A-j), the following methods can be mentioned, which have no limitative meaning, however.

(B-a) Method comprising subjecting a compound having a polymerizable alkenyl group and a hydroxy group in one molecule, such as one represented by the general formula (8) shown below, as a second monomer, to reaction in the step of synthesizing the vinyl polymer by radical polymerization:

(wherein $R^3$, $R^4$ and $R^5$ are as defined above).

The time for subjecting said compound having a polymerizable alkenyl group and a hydroxy group in one molecule to reaction is not particularly restricted but, particularly when rubber-like properties are expected to the polymer to be obtained particularly by living radical polymerization, it is preferred that said compound be added as a second monomer at the final stage of the polymerization reaction or after completion of the reaction of the predetermined monomer(s).

(B-b) Method comprising subjecting an alkenyl alcohol, such as 10-undecenol, 5-hexenol or allyl alcohol, to reaction at the final stage of polymerization or after completion of the predetermined monomer(s) in synthesizing the vinyl polymer by living radical polymerization.

(B-c) Method comprising subjecting the vinyl monomer(s) to radical polymerization using a large amount of a hydroxy-containing chain transfer agent, such as a hydroxy-containing polysulfide, as disclosed in Japanese Kokai Publication Hei-05-262808, for instance.

(B-d) Method comprising subjecting the vinyl monomer(s) to radical polymerization using hydrogen peroxide or a hydroxy-containing initiator, as disclosed in Japanese Kokai Publication Hei-06-239912 or Japanese Kokai Publication Hei-08-283310, for instance.

(B-e) Method comprising subjecting the vinyl monomer(s) to radical polymerization using an alcohol in excess, as disclosed in Japanese Kokai Publication Hei-06-116312, for instance.

(B-f) Method comprising subjecting the halogen atom of a vinyl polymer having at least one highly reactive carbon-halogen bond to hydrolysis or reaction with a hydroxy-containing compound to thereby terminally introduce a hydroxy group, as disclosed in Japanese Kokai Publication Hei-04-132706, for instance.

(B-g) Method comprising reacting a vinyl polymer having at least one highly reactive carbon-halogen bond with a hydroxy-containing stabilized carbanion represented by the general formula (9) to thereby substitute the halogen atom;

(wherein $R^7$, $R^8$ and $R^9$ are as defined above).

As the electron-withdrawing group represented by $R^7$ or $R^8$, those having the structure of $-CO_2R$, $-C(O)R$ or $-CN$ are preferred.

(B-h) Method comprising preparing an enolate anion by reacting a vinyl polymer having at least one highly reactive carbon-halogen bond with an elementary metal, such as zinc, or an organometallic compound and then reacting said enolate anion with an aldehyde or ketone.

(B-i) Method comprising reacting a vinyl polymer having at least one highly reactive carbon-halogen bond with a hydroxy-containing oxy anion or carboxylate anion represented by the general formula (10) or (11) shown below to thereby substitute the halogen:

$$HO—R^{10}—O^-M^+ \quad (10)$$

(wherein $R^{10}$ and $M^+$ are as defined above);

$$HO—R^{11}—C(O)O^-M^+ \quad (11)$$

(wherein $R^{11}$ and $M^+$ are as defined above).

In the present invention, when no halogen atom is directly involved in the method for introducing the hydroxy group, as in the methods (B-a) to (B-e), living radical polymerization is preferably used for synthesizing the vinyl polymer. The method (B-b) is more preferred because of easier control.

In cases where hydroxy group is introduced by converting the halogen of a vinyl polymer having at least one highly reactive carbon-halogen bond, the use is preferred of a vinyl polymer having at least one highly reactive terminal carbon-halogen bond, which is obtained by radical polymerization (atom transfer radical polymerization) of a vinyl monomer using an organic halide or halogenated sulfonyl compound as the initiator and a transition metal complex as the catalyst. The method (B-i) is more preferred because of easier control.

The compound having, in one molecule, a crosslinkable silyl group and a group capable of reacting with a hydroxy group, for example an isocyanato group, includes, among others, γ-isocyanatopropyltrimethoxysilane, γ-isocyanatopropylmethyldimethoxysilane and γ-isocyanatopropyltriethoxysilane, and those catalysts for urethane bond formation which are known in the art may be used, if necessary.

The compound having a polymerizable alkenyl group and a crosslinkable silyl group in one molecule, which is to be used in the method (C) includes, among others, compounds represented by the general formula (12) shown below, such as trimethoxysilylpropyl (meth)acrylate and methyldimethoxysilylpropyl (meth)acrylate:

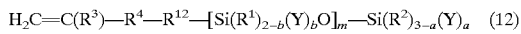

$$H_2C=C(R^3)—R^4—R^{12}—[Si(R^1)_{2-b}(Y)_bO]_m—Si(R^2)_{3-a}(Y)_a \quad (12)$$

(wherein $R^1$, $R^2$, $R^3$, $R^4$, Y, a, b and m are as defined above and $R^{12}$ represents a direct bond or a divalent organic group containing 1 to 20 carbon atoms, which may optionally contain one or more ether bonds).

The time for subjecting said compound having, in one molecule, a polymerizable alkenyl group and a crosslinkable silyl group to reaction is not particularly restricted but, particularly when rubber-like properties are expected to the polymer to be obtained by living radical polymerization, it is preferred that said compound be subjected to reaction as a second monomer at the final stage of the polymerization reaction or after completion of the predetermined monomer (s).

The crosslinkable silyl-containing chain transfer agent to be used in carrying out the chain transfer agent method (D) includes, among others, crosslinkable silyl-containing mercaptans and crosslinkable silyl-containing hydrosilanes, as disclosed in Japanese Kokoku Publication Hei-03-14068 or Japanese Kokoku Publication Hei-04-55444, for instance.

The vinyl polymer having at least one highly reactive carbon-halogen bond to be used in the method (E) can be obtained by the methods (E-a) and (E-b), as mentioned above. The compound having, in one molecule, a crosslinkable silyl group and a stabilized carbanion includes, among others, compounds represented by the general formula (13):

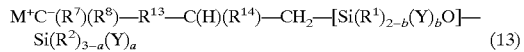

$$M^+C^-(R^7)(R^8)—R^{13}—C(H)(R^{14})—CH_2—[Si(R^1)_{2-b}(Y)_bO]—Si(R^2)_{3-a}(Y)_a \quad (13)$$

(wherein $R^1$, $R^2$, $R^7$, $R^8$, Y, a, b and m are as defined above; $R^{13}$ represents a direct bond or a divalent organic group containing 1 to 10 carbon atoms, which may optionally contain one or more ether bonds; and $R^4$ represents a hydrogen atom, an alkyl group containing 1 to 10 carbon atoms, an aryl group containing 6 to 10 carbon atoms or an aralkyl group containing 7 to 10 carbon atoms).

Preferred as the electron-withdrawing group represented by $R^7$ or $R^8$ are those having the structure of $—CO_2R$, $—C(O)R$ or $—CN$.

For obtaining a vinyl-polymer having at least one crosslinkable silyl group at its molecular chain terminus by polymerization using an organic halide or halogenatedsulfonyl compound as the initiator and a transition metal complex as the catalyst, the use of an organic halide or halogenated sulfonyl compound having two or more highly reactive carbon-halogen bonds which serve as initiation sites is preferred. Specific examples of such compounds are shown below.

$$\text{o,m,p-} \quad X—CH_2—C_6H_4—CH_2—X \quad (i\text{-}1)$$

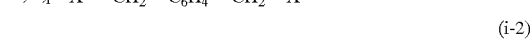

$$\text{o,m,p-} \quad X—CH(CH_3)—C_6H_4CH(CH_3)X \quad (i\text{-}2)$$

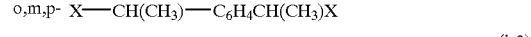

$$\text{o,m,p-} \quad X—C(CH_3)_2—C_6H_4—C(CH_3)_2—X \quad (i\text{-}3)$$

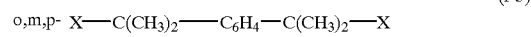

(i-4)

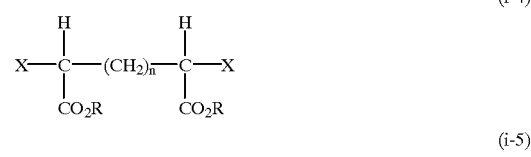

(i-5)

(i-6)

(i-7)

(i-8)

(i-9)

-continued

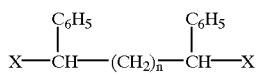
(i-10)

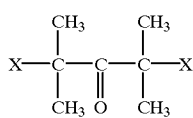
(i-11)

(In the formulas, R represents an alkyl group containing 1 to 20 carbon atoms, an aryl group containing 6 to 20 carbon atoms or an aralkyl group containing 7 to 20 carbon atoms; $C_6H_4$ represents a phenylene group; n represents an integer of 0 to 20; and X represents a chlorine, bromine or iodine atom).

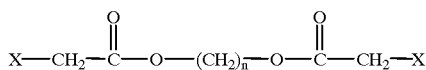
(i-12)

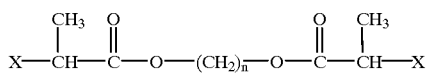
(i-13)

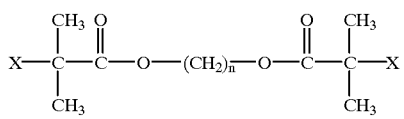
(i-14)

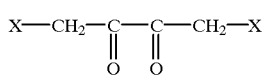
(i-15)

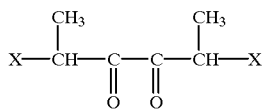
(i-16)

X—C(CH$_3$)$_2$—C(O)—C(O)—C(CH$_3$)$_2$—X (i-17)

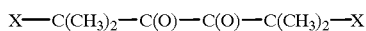

o,m,p- 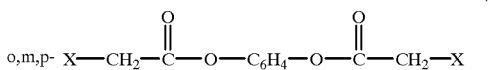 (i-18)

o,m,p- 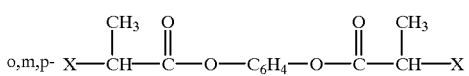 (i-19)

o,m,p- 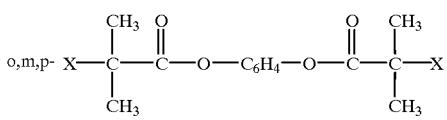 (i-20)

o,m,p- X—SO$_2$—C$_6$H$_4$—SO$_2$—X (i-21)

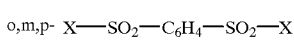

(In the formulas, X represents a chlorine, bromine or iodine atom; n represents an integer of 0 to 20; and $C_6H_4$ represents a phenylene group).

The vinyl polymer having at least one crosslinkable silyl group at its molecular chain terminus can be obtained also by methods other than those mentioned above.

When a crosslinkable silyl-containing organic halide is used as the initiator, a vinyl polymer having the crosslinkable silyl group at one terminus and having the structure of the general formula (2) at the other terminus is obtained. By converting the halogen at the termination terminus of the thus-obtained polymer to a crosslinkable silyl group, it is possible to obtain a vinyl polymer having crosslinkable silyl groups at both termini. As the method of such conversion, those already mentioned hereinabove can be used.

Said crosslinkable silyl-containing organic halide is not particularly restricted but includes, among others, compounds having the structure represented by the general formula (14) or (15):

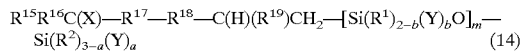
(14)

(wherein $R^1$, $R^2$, a, b, m, X and Y are as defined above; $R^{15}$ and $R^{16}$ each independently represents a hydrogen atom, an alkyl group containing 1 to 20 carbon atoms, an aryl group containing 6 to 20 carbon atoms or an aralkyl group containing 7 to 20 carbon atoms, or those are bound together at each other end; $R^{17}$ represents —C(O)O—, —C(O)— or an o-, m- or p-phenylene group; $R^{18}$ represents a direct bond or a divalent organic group containing 1 to 10 carbon atoms, which may optionally contain one or more ether bonds; and $R^{19}$ represents a hydrogen atom, an alkyl group containing 1 to 10 carbon atoms, an aryl group containing 6 to 10 carbon atoms or an aralkyl group containing 7 to 10 carbon atoms);

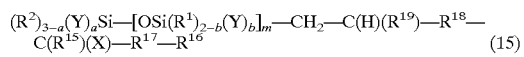
(15)

(wherein $R^1$, $R^2$, $R^{15}$, $R^{16}$, $R^{17}$, $R^{18}$, $R^{19}$, a, b, m, X and Y are as defined above).

When a crosslinkable silyl-containing organic halide is used as the initiator, a polymer having the crosslinkable silyl group at one terminus and the halogen at the other terminus is obtained. By coupling the halogen termini using a compound having two or more same or different functional groups capable of substituting the halogen of said polymer, it is also possible to obtain a vinyl polymer having crosslinkable silyl groups at both termini.

The compound having two or more same or different functional groups capable of substituting the terminal halogen atom is not particularly restricted but includes, among others, polyols, polyamines, polycarboxylic acids, polythiols, and salts thereof, and alkali metal sulfides as preferred examples.

When an alkenyl-containing organic halide is used as the initiator, a polymer having the alkenyl group at one terminus and the halogen atom at the other terminus is obtained. By converting the terminal halogen atom to an alkenyl-containing substituent, it is possible to obtain a vinyl polymer having an alkenyl group at both molecular chain termini. By converting alkenyl groups to crosslinkable silyl groups by the methods mentioned above, for instance, it is possible to obtain a vinyl polymer having crosslinkable silyl groups at both termini.

In applications where rubber-like properties are required, it is preferred that at least one crosslinkable silyl group exist at its molecular chain terminus, since the molecular weight between crosslinkable sites which greatly influences the rubber elasticity can then be increased. It is more preferred that all crosslinkable silyl groups occur at molecular chain termini.

Therefore, it is preferred that the vinyl polymer, which has at least one hydroxy, halogen or alkenyl group and is to be used in synthesizing a vinyl polymer having at least one crosslinkable silyl group, have such functional groups at its molecular chain terminus.

Methods of producing vinyl polymers having at least one crosslinkable silyl group, in particular (meth)acrylic polymers, are disclosed, for example, in Japanese Kokoku Publication Hei-03-14068, Japanese Kokoku Publication Hei-04-55444 and Japanese Kokai Publication Hei-06-211922. Since these methods use the "chain transfer agent technique", the crosslinkable silyl group exists at a terminus at a relatively high percentage. However, the polymers obtained generally have a molecular weight distribution as wide as 2 or more, so that the problem arises that the viscosity is high. Therefore, the use of living radical polymerization is preferred in producing a vinyl polymer having a narrow molecular weight distribution and a low viscosity and having a crosslinkable silyl group at a terminus with a high percentage.

The epoxy resin, which serves as a component (II) according to the present invention, includes, but is not limited to, bisphenol A-based epoxy resins, bisphenol F-based epoxy resins, novolak type epoxy resins, bisphenol A-propylene oxide adduct-derived glycidyl ether type epoxy resins, hydrogenated bisphenol A-based epoxy resins, tetrabromobisphenol A glycidyl ether and like flame-retardant epoxy resins, p-hydroxybenzoic acid glycidyl ether ester type epoxy resins, m-aminophenol type epoxy resins, diaminodiphyenylmethane type epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ether, glycidyl ethers of glycerol and other polyhydric alcohols, hydantoin type epoxy resins, epoxidized petroleum resins and epoxidized unsaturated polymers. Epoxy resins in general use can be used as well.

Among these epoxy resins, those having at least one epoxy group in one molecule are preferred since they show high reactivity in curing and readily give cured products having a three-dimensional network structure. Specifically, bisphenol A-based epoxy resins and novolak type epoxy resins are preferred, and bisphenol A-based epoxy resins are more preferred. These epoxy resins may be used singly or two or more of them may be used combinedly.

The combined use of various curing agents for epoxy resins can produce an improved effect in certain instances. Thus, the use of various curing agents also falls within the scope of the present invention. As examples of such curing agents, there may be mentioned ethylenediamine, diethylenetriamine, triethylenetetramine, tetraethylenepentamine, hexamethylenediamine, diethylaminopropylamine, N-aminoethylpiperazine, Lamiron C-260 (product of BASF), Araldit HY-964 (product of Ciba), menthenediamine (product of Rohm and Haas), isophoronediamine, diaminodicyclohexylmethane, m-xylenediamine, m-phenylenediamine, diaminodiphenylmethane, diaminodiphenylsulfone and other primary amines, linear diamines of the formula $(CH_3)_2N(CH_2)_nN(CH_3)_2$ (in which n is an integer of 1 to 10), linear tertiary amines of the formula $(CH_3)_2N(CH_2)_nCH_3$ (in which n is an integer of 0 to 10), tetramethylguanidine, alkyl tertiary monoamines represented by the formula $N\{(CH_2)_nCH_3\}_3$ (in which n is an integer of 1 to 10), triethanolamine, piperidine, N,N'-dimethylpiperazine, triethylenediamine, pyridine, picoline, diazabicycloundecene, benzyldimethylamine, 2-(dimethylaminomethyl)phenol, 2,4,6-tris(dimethyl-aminomethyl)phenol and other secondary or tertiary amines, phthalic anhydride, trimellitic anhydride, pyromellitic anhydride, benzophenonetetracarboxylic anhydride and other acid anhydrides, various polyamide resins, dicyandiamide and derivatives thereof, various imidazoles, N-(β-aminoethyl)-γ-aminopropyltrimethoxysilane and other compounds having, in one molecule, an amino group and a hydrolyzable silyl group, and ketimine obtained by condensation reaction of an amine compound and a carbonyl compound, among others. Specific examples of the ketimine compounds are described in Japanese Kokai Publication Hei-07-242737, for instance.

Addition of a compound having a group capable of reacting both with the crosslinkable silyl group represented by the general formula (1) and with an epoxy group to the curable resin composition results in a further increase in strength, hence is preferred. As specific examples of such compound, there may be mentioned, among others, N-(γ-aminoethyl)-γ-aminopropyltrimethoxysilane, N-(γ-aminoethyl)-γ-aminopropyltriethoxysilane and γ-glycidoxypropyl-trimethoxysilane.

In the curable composition of the present invention, the mixing ratio between the component (I) and the epoxy resin as component (II) is preferably within the weight ratio range of 100/1 to 1/100, more preferably 100/5 to 5/100. This curable composition is preferably used in adhesion of materials differing in coefficient of linear expansion or as elastic adhesives for adhesion of parts undergoing repeated displacement due to heat cycles and like parts.

The polyether polymer having at least one crosslinkable silyl group, which also serves as component (II) according to the present invention, may contain or not contain a urethane bond within the main chain. It is preferred that the main chain polyether be essentially polypropylene oxide. Since a lower viscosity facilitates handling of the composition, the polypropylene oxide polymer preferably has a molecular weight distribution (Mw/Mn) of not more than 1.5. The crosslinkable silyl group may be the same as or different from that of the vinyl polymer, which is component (I). The mixing ratio between the vinyl polymer serving as component (I) and the polyether polymer serving as component (II) is preferably within the weight ratio range of 100/1 to 1/100, more preferably 100/5 to 5/100.

The curable composition of the present invention has sufficient physical properties and, in addition, can have a low viscosity. Therefore, it is preferably used as a sealing material or a pressure sensitive adhesive.

For curing the vinyl polymer or polyether polymer each having at least one crosslinkable silyl group and to be used according to the present invention, a condensation catalyst may be used. Useful as said condensation catalyst are titanate esters such as tetrabutyl titanate and tetrapropyl titanate; organotin compounds such as dibutyltin dilaurate, dibutyltin diacetylacetonate, dibutyltin maleate, dibutyltin diacetate, dibutyltin dimethoxide, reaction products derived from dibutyltin oxide and a carboxylic acid ester, carboxylic acid or hydroxy-containing compound, organotin compounds such as tin octylate and tin naphthenate; organoaluminum compounds such as aluminum trisacetylacetonate, aluminum tris(ethyl acetoacetate) and diisopropoxyaluminum ethyl acetoacetate; organozirconium compounds such as zirconium tetraacetylacetonate, zirconium tetraisopropoxide and zirconium tetrabutoxide; organolead compounds such as lead octylate; amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine and 1,3-diazabicyclo[5.4.6]-undecene-7, and carboxylic acid salts thereof; reaction products from or mixtures of an amine compound and an organotin compound, such as a reaction product from or a mixture of laurylamine and tin octylate; low-molecular polyamide resins obtained from an excess of a polyamine and a polybasic acid; reaction products from an excess of a polyamine and an epoxy compound; amino-containing silane coupling agents such as γ-aminopropyltrimethoxysilane and N-(β-amino-ethyl) aminopropylmethyldimethoxysilane; and like known silanol condensation catalysts. These may be used singly or two or more of them may be used combinedly according to need.

They are used preferably in an amount of 0 to 10 parts by weight per 100 parts of the vinyl polymer having at least one crosslinkable silyl group. When an alkoxy group is used for the hydrolyzable group Y, this polymer alone shows a slow rate of curing, hence the use of a curing catalyst is preferred.

For adjusting the physical properties of the curable composition of the present invention, a filler may be used. Specifically, reinforcing fillers such as fumed silica, precipitated silica, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, zinc oxide, activated zinc white and shirasu balloons; and fibrous fillers such as asbestos, glass fiber and filaments may be used. For obtaining high strength cured products using such fillers, the use of a filler selected from among fumed silica, precipitated silica, silicic anhydride, hydrous silicic acid, carbon black, finely divided surface-treated calcium carbonate, calcined clay, clay, activated zinc white and the like in an amount of 1 to 200 parts by weight per 100 parts by weight of the total amount of the crosslinkable silyl-containing polymers gives favorable results. For obtaining low-strength, high-elongation cured products, the use of a filler selected from among titanium oxide, calcium carbonate, talc, ferric oxide, zinc oxide, shirasu balloons and the like in an amount of 1 to 200 parts by weight per 100 parts by weight of the total amount of the crosslinkable silyl-containing polymers gives favorable results. These fillers may be used singly or two or more of them may be used combinedly.

A plasticizer may be added to adjust the physical properties and viscosity. Specifically, said plasticizer includes phthalic acid esters such as dibutyl phthalate, diheptyl phthalate, di(2-ethylhexyl) phthalate, diisodecyl phthalate and butyl benzyl phthalate; nonaromatic dibasic acid esters such as dioctyl adipate and dioctyl sebacate; polyalkylene glycol esters such as diethylene glycol dibenzoate and triethylene glycol dibenzoate; phosphoric acid esters such as tricresyl phosphate and tributyl phosphate; polyethylene glycol and polypropylene glycol and polyethers derived from these by conversion of the hydroxy groups; chlorinated paraffin; alkyldiphenyls, partially hydrogenated terphenyl and like hydrocarbon oils. These may be used singly or two or more of them may be used combinedly. These are not always necessary, however. It is also possible to incorporate those plasticizers in the step of polymer production. The use of plasticizer(s) in an amount of 0 to 100 parts by weight per 100 parts by weight of the total amount of the crosslinkable silyl-containing polymers gives favorable results.

The polymer according to the present invention itself has adhesiveness to glass, ceramics other than glass, and metals, among others, and/or can be adhered to a wide variety of materials by using various primers, so that the use of an adhesion promoter is not always necessary. For attaining stable adhesion to various adherends, however, the use of an adhesion promoter is preferred.

As the adhesion promoter, there may be mentioned resol or novolak type phenolic resins obtained by the reaction of a phenolic compound, such as phenol, cresol, xylenol, resorcinol, alkyl phenol, or modified phenol (e.g. cashew oil-modified phenol, tall oil-modified phenol), and an aldehyde compound, such as formalin or paraformaldehyde; sulfur; epoxy resins such as bisphenol A-based epoxy resins, bisphenol F-based epoxy resins, novolak type epoxy resins, bisphenol A-propylene oxide adduct-derived glycidyl ether type epoxy resins and hydrogenated bisphenol A-based epoxy resins; alkyl titanates such as tetrabutyl titanate; aromatic polyisocyanates such as tolylene diisocyanate and diphenylmethanediisocyanate; compounds containing an amino group and a crosslinkable silyl group in one molecule, such as γ-aminopropyltrimethoxysilane, γ-aminopropylmethyldimethoxysilane, γ-aminopropylmethyldimethoxysialne, N-(β-aminoethyl)-γ-aminopropyltrimethoxysilane, N-(β-aminoethyl)-γ-aminopropyltriethoxysilane and N-(β-aminoethyl)-γ-aminopropylmethyldimethoxysilane; compounds containing an epoxy group and a crosslinkable silyl group in a one molecule such as γ-glycidoxypropyltrimethoxysilane, γ-glycidoxypropyltriethoxysilane and γ-glycidoxypropylmethyldimethoxysilane; compounds containing a mercapto group and a crosslinkable silyl group in one molecule such as γ-mercaptopropyltrimethoxysilane, γ-mercaptopropyltriethoxysilane and γ-mercaptopropylmethyldimethoxysilane; compounds containing an isocyanato group and a crosslinkable silyl group in one molecule such as γ-isocyanatopropyltrimethoxysilane, γ-isocyanatopropyltriethoxysilane and γ-isocyanatopropylmethyldimethoxysilane; reaction products from the compounds containing an amino group and a crosslinkable silyl group in one molecule as mentioned above and the compounds containing an epoxy group and a crosslinkable silyl group in one molecule as mentioned above or said compounds containing an isocyanato group and a crosslinkable silyl group in one molecule; reaction products from compounds containing a (meth)acryloxy group and a crosslinkable silyl group in one molecule, such as γ-(meth)acryloxypropyltrimethoxysilane, γ-(meth)acryloxypropyltriethoxysilane or γ-(meth)acryloxypropylmethyldimethoxysilane, and the above compounds containing an amino group and a crosslinkable silyl group in one molecule; and the like. These may be used singly or two or more of them may used in combination. Preferred among those mentioned above from the viewpoint of relatively easy control of physical properties and adhesiveness are compounds containing an amino group and a crosslinkable silyl group in one molecule and compounds containing an epoxy group and a crosslinkable silyl group in one molecule, and compounds containing a mercapto group and a crosslinkable silyl group in one molecule, reaction products from compounds containing an amino group and a crosslinkable silyl group in one molecule and compounds containing an epoxy group and a crosslinkable silyl group in one molecule, reaction products from compounds containing a (meth)acryloxy group and a crosslinkable silyl group in one molecule and compounds containing an amino group and a crosslinkable silyl group in one molecule, and like compounds having a crosslinkable silyl group and an organic group containing at least one atom selected from among nitrogen, oxygen and sulfur atoms in one molecule. The still more preferred from the standpoint of high adhesiveness is a compound having a nitrogen-containing organic group and a crosslinkable silyl group within its molecule, that is to say a compound in which said organic group having at least one atom selected from among nitrogen, oxygen and sulfur is an amino group, an isocyanate group or a group formed by reaction thereof.

Said adhesion promoter is used preferably in an amount of 0.01 to 20 parts by weight per 100 parts by weight of the total amount of the crosslinkable silyl-containing polymers. At an addition amount of 0.01 part by weight, the adhesiveness improving effect can hardly be produced. At an amount exceeding 20 parts by weight, the physical properties of cured products may adversely be affected. The addition amount of the adhesion promoter is preferably 0.1 to 10 parts by weight, more preferably 0.5 to 5 parts by weight.

A physical property modifier can be used to control the physical properties of the cured product by increasing the hardness upon curing or by conversely reducing the hardness and increasing the elongation, for instance. Thus, for example, alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane; various silane coupling agents such as vinyltrimethoxysilane and vinylmethyldimethoxysilane; silicone varnishes; and polysiloxanes are added as physical property modifiers according to need. Favorable results are obtained by adding such modifiers in an amount within the range of 0 to 20 parts by weight per 100 parts of the total amount of the crosslinkable silyl-containing polymers.

For increasing or decreasing the rate of curing of the curable composition, a curability modifier may be added and, for suppressing viscosity increases during storage, a storage stability improving agent may be added. As said curability modifier or storage stability improving agent, there may be mentioned alcohols such as methanol and ethanol; orthoesters such as methyl orthoformate; crosslinkable silyl-containing compounds such as tetraethoxysilane, methyltrimethoxysilane and vinyltrimethoxysilane; and carboxylic acids such as 2-ethylhexanoic acid. When these are added in an amount within the range of 0 to 20 parts by weight per 100 parts by weight of the total amount of the polymers having at least one crosslinkable silyl group, favorable results can be obtained.

In the curable composition of the present invention, there may optionally be incorporated various solvents such as toluene and methyl ethyl ketone; various silane coupling agents, crosslinkable silyl-containing polysiloxanes and other various modifiers; rheology modifiers such as polyamide waxes, hydrogenated castor oil and metal soaps; surface characteristics and/or weathering resistance improvers such as ultraviolet-curable resins, oxygen-curable resins and the like; colorants, such as pigments and dyes; antioxidants, ultraviolet absorbers, light stabilizers, flame retardants and so forth.

The curable composition of the present invention may be prepared as a one-component formulation by mixing up all components and ingredients. The resulting composition is stored in tightly closed containers and, when applied, it absorbs moisture in the air and is thereby cured. It is also possible to prepare said composition as a two-component formulation, namely a curing agent composition separately prepared by compounding a curing catalyst, filler, plasticizer and water, for instance, and the above polymer composition. These two compositions are mixed up prior to use. However, a one-component formulation is preferred because of easiness of handling and less possibility of making mistakes in application.

BEST MODES FOR CARRYING OUT THE INVENTION

The following examples illustrate the present invention in further detail. It is to be noted, however, that these examples are by no means limitative of the scope of the present invention.

SYNTHESIS EXAMPLE 1

Synthesis of a Halogen-terminated Poly(n-butyl acrylate)

A 50-mL flask was charged with 0.63 g (4.4 mmol) of cuprous bromide, 0.76 g (4.4 mmol) of pentamethyldiethylenetriamine, 5 mL of acetonitrile, 1.6 g (4.4 mmol) of diethyl 2,5-dibromoadipate and 44.7 g (349 mmol) of n-butyl acrylate and, after deaeration by freezing, the reaction was allowed to proceed in a nitrogen atmosphere at 70° C. for 7 hours. The copper catalyst was removed by passing the reaction mixture through an activated alumina column. This purification procedure gave a bromine-terminated polymer. The polymer obtained had a number average molecular weight of 10,700 as determined by GPC (mobile phase: chloroform; expressed in terms of polystyrene equivalent) with a molecular weight distribution of 1.15.

Synthesis of an Alkenyl-terminated Poly(n-butyl acrylate)

In a nitrogen atmosphere, a 200-mL flask was charged with 35 g of the halogen-terminated poly(n-butyl acrylate) obtained in the above manner, 2.2 g (16.1 mmol) of potassium pentenoate and 35 mL of DMAc and the reaction was allowed to proceed at 70° C. for 4 hours. The unreacted portion of potassium pentenoate and the byproduct potassium bromide were removed from the reaction mixture by extraction with water. This purification procedure gave an alkenyl-terminated polymer. The polymer obtained had a number average molecular weight of 11,300 as determined by GPC (mobile phase: chloroform; expressed in terms of polystyrene equivalent) with a molecular weight distribution of 1.12. The number of alkenyl groups per polymer molecule as determined by $^1$H-NMR analysis was 1.82.

Synthesis of a Crosslinkable Silyl-terminated Poly (n-butyl acrylate)

A 200-mL pressure reaction tube was charged with 15 g of the alkenyl-terminated polymer obtained in the above manner, 1.8 mL (14.5 mmol) of methyldimethoxysilane, 0.26 mL (2.4 mmol) of methyl orthoformate and 10-4 mmol of platinum-bis(divinyltetramethyldisiloxane), and the reaction was allowed to proceed at 100° C. for 4 hours, to give a crosslinkable silyl-terminated polymer. The polymer obtained had a viscosity of. 44 Pa.s and a number average molecular weight of 11,900 as determined by GPC (mobile phase: chloroform; expressed in terms of polystyrene equivalent) with a molecular weight distribution of 1.12. The number of crosslinkable silyl groups per polymer molecule as determined by $^1$H-NMR analysis was 1.46.

COMPARATIVE SYNTHESIS EXAMPLE 1

Synthesis of a Crosslinkable Silyl-containing Poly (n-butyl acrylate) Using a Crosslinkable Silyl-containing Monomer In a one-liter flask, 400 g of toluene, 385 g of butyl acrylate, 15 g of methyldimethoxysilylpropyl methacrylate and 6 g of azobisisobutyronitrile were bubbled with nitrogen at 105° C. for 7 hours to thereby allow the polymerization to proceed. By distilling off the toluene, there was obtained a crosslinkable silyl-containing poly(n-butyl acrylate). This polymer had a viscosity of 74 Pa.s and a number average molecular weight of 8,500 as determined by GPC (mobile phase: chloroform; expressed in terms of polystyrene equivalent) with a molecular weight distribution of 2.47. The number of hydroxyl groups per polymer molecule as determined by $^1$H-NMR analysis was 1.40.

COMPARATIVE SYNTHESIS EXAMPLE 2

Synthesis of Hydroxy-terminated Polypropylene Oxide

An autoclave was charged with 0.04 g of zinc hexacyanocobaltate-glyme complex, a solution of 2.0 g of dipropylene glycol in THF and 9,6 g of propylene oxide and the reaction was carried out in a nitrogen atmosphere at 76° C. Then, 145.2 g of propylene oxide was added to the reaction system. The unreacted portion of the monomer and the solvent were recovered, and the reaction product was purified to give 150 g of an oil. The product showed a single peak upon GPC analysis and had a molecular weight distribution of 1.14. The hydroxy value was 11.8 mg KOH/g.

Synthesis of an Unsaturated Group-terminated Polypropylene Oxide

To 120 g of the hydroxy-terminated polypropylene oxide obtained in the above manner was added 5.8 g (30.2 mmol) of a solution of sodium methoxide in methanol (28% by weight) and the reaction was carried out in an autoclave at 130° C. for 1 hour, followed by removal of the volatile matter under reduced pressure. The residue was placed in a nitrogen atmosphere and 2.8 g (36.2 mmol) of allyl chloride was added and the reaction was carried out for 2 hours.

The reaction mixture was dissolved in hexane and subjected to adsorption treatment on aluminum silicate and the hexane was then distilled off under reduced pressure to give an unsaturated group-terminated polypropylene oxide.

Synthesis of a Crosslinkable Silyl-terminated Polypropylene Oxide

A glass-made pressure reaction vessel was charged with 120 g of the unsaturated group-terminated polypropylene oxide obtained in the above manner and, after addition of 0.02 g of a solution of chloroplatinic acid in isopropanol (prepared by dissolving 25 g of $H_2PtCl_6.6H_2O$ in 500 g of isopropanol), and the mixture was stirred for 30 minutes. Then, 2.1 g (20.2 mmol) of methyldimethoxysilane was added dropwise and the reaction was carried out at 90° C. for 2 hours. The volatile matter was removed under reduced pressure to give a crosslinkable silyl-terminated polypropylene oxide. This polymer had a viscosity of 6 Pa.s and a number average molecular weight of 17,300 as determined by GPC (mobile phase: chloroform; expressed in terms of polystyrene equivalent) with a molecular weight distribution of 1.14.

EXAMPLE 1

The crosslinkable silyl-terminated poly(n-butyl acrylate) obtained in Synthesis Example 1 and Epikote 828 (bisphenol A-based epoxy resin; product of Yuka Shell Epoxy) were mixed up in a weight ratio of 2:1 or 1:1 and the mixture was deaerated by centrifugation. After 7 days of standing, the state of the mixture was observed and the compatibility was evaluated. The results are shown in Table 1.

Comparative Examples 1 and 2

The procedure of Example 1 was followed using the polymer obtained in Comparative Example 1 or 2 in lieu of the polymer obtained in Synthesis Example 1 and the compatibility was evaluated. The results are also shown in Table 1.

TABLE 1

|  | Example 1 | Comparative Example 1 | Comparative Example 2 |
|---|---|---|---|
| Polymer used | Synthesis Example 1 | Comparative Synthesis Example 1 | Comparative Synthesis Example 2 |
| Polymer: Epikote 828 (weight ratio) |  |  |  |
| 2:1 | No separation, no turbidity | No separation, no turbidity | No separation, no turbidity |
| 1:1 | No separation, no turbidity | No separation, no turbidity | Separation and turbidity |

In the systems of Example 1 and Comparative Example 1, the vinyl polymer and epoxy resin remained compatible while, in Comparative Example 2, the mixture separated into two phases when the ratio was 1:1 although the polyether polymer remained compatible when the ratio was 2:1. It is thus seen that the vinyl polymer has high compatibility.

EXAMPLE 2

The vinyl polymer (100 weight parts) obtained in Synthesis Example 1 was mixed up with 50 weight parts of Epikote 828, 2 weight parts of a silanol condensation catalyst (#918; product of Sankyo Organic Chemicals), 5 weight parts of 2,4,6-tris(dimethylaminomethyl)phenol, 2 weight parts of N-(β-aminoethyl)-γ-aminopropyltrimethoxysilane and 1 weight part of water and, after deaeration by centrifugation, the mixture was poured into a flat mold and cured at room temperature for 1 day and then at 50° C. for 3 days to give a cured product sheet. Dumbbell test specimens No. 2(1/3) were punched out from the cured sheet and subjected to tensile testing (200 mm/min) using an autograph and the stress at 30% elongation (M30) was determined. Separately, the mixture was applied to an A 1050 P aluminum test specimen and cured at room temperature for 3 days and at 50° C. for 4 days and a tensile shear adhesion strength test was performed according to JIS K 6850. The results are shown in Table 2.

COMPARATIVE EXAMPLES 3 AND 4

The procedure of Example 2 was followed using the polymer obtained in Comparative Example 1 or 2 in lieu of the polymer obtained in Synthesis Example 1 and the physical properties were measured. The results are also shown in Table 2.

TABLE 2

|  | Example 2 | Comparative Example 3 | Comparative Example 4 |
|---|---|---|---|
| Polymer used | Synthesis Example 1 | Compar. Synth. Example 1 | Compar. Synth. Example 2 |
| M30 (MPa) | 4.9 | 1.5 | 0.4 |
| Shear strength (MPa) | 6.5 | 4.6 | 6.6 |

A high modulus and high shear strength were obtained in Example 2. The mixture compounded in Comparative Example 3 was higher in viscosity than that of Example 2 and therefore not easy to handle. The cured product was low in modulus and shear strength and had insufficient physical properties for use as an adhesive. In Comparative Example 4, the shear strength was sufficient but the modulus was low, hence was found unsuitable because of excessive deformation in the adhesion joint.

EXAMPLE 3

The vinyl polymer (100 weight parts) obtained in Synthesis Example 1 was mixed up with 100 weight parts of Epikote 828, 2 weight parts of a silanol condensation catalyst (#918; product of Sankyo Organic Chemicals), 10 weight parts of 2,4,6-tris(dimethylaminomethyl)phenol, 2 weight parts of N-(β-aminoethyl)-γ-aminopropyltrimethoxysilane and 1 weight part of water and the mixture was applied to an A 1050 P aluminum test specimen and cured at room temperature and at 50° C. for 4 days. A tensile shear adhesion strength test was performed according to JIS K 6850. The results are shown in Table 3.

COMPARATIVE EXAMPLE 5 AND 6

The procedure of Example 3 was followed using the polymer obtained in Comparative Example 1 or 2 in lieu of the polymer obtained in Synthesis Example 1 and the physical property was measured. The results are also shown in Table 3.

TABLE 3

|  | Example 3 | Comparative Example 5 | Comparative Example 6 |
|---|---|---|---|
| Polymer used | Synthesis Example 1 | Compar. Synth. Example 1 | Compar. Synth. Example 2 |
| Shear strength (MPa) | 8.0 | 5.0 | 8.9 |

The mixture compounded in Comparative Example 5 was higher in viscosity than that of Example 3, hence difficult to handle. In Example 3 and Comparative Example 6, sufficient strength values were obtained. The formulation of Comparative Example 6, however, is a noncompatible one, as shown in Comparative Example 2, and therefore inappropriate from the viewpoint of stable expression of physical properties. In Comparative Example 5, the strength was insufficient.

EXAMPLES 4 AND 5

The vinyl polymer of Synthesis Example 1 and the polyether polymer of Comparative Synthesis Example 2 were mixed up in the ratio shown in Table 4 and the viscosity of the mixture was measured. This mixture (100 weight parts) was mixed up with 1 weight part of water and 1 weight part of dibutyltin dimethoxide with stirring and the resulting mixture was poured into a 2-mm-thick mold. After deaeration at room temperature using a vacuum drier, curing was effected at 50° C. for 3 days, to give a rubber-like cured sheet. The gel fraction was determined by extraction with toluene. Dumbbell test specimens No. 2(1/3) were punched out from the rubber-like cured sheet and subjected to tensile testing (200 mm/min) using an autograph and the stress at 50% elongation (M50), strength at rupture (Tb) and elongation at rupture (Eb) were determined. Separately, small pieces were cut out from the rubber-like cured sheet and placed in a sunshine weather-o-meter. After the lapse of 60 hours, the pieces were observed for their state (accelerated weathering resistance). The results are shown in Table 4.

COMPARATIVE EXAMPLES 7 AND 8

The procedure of Example 4 or 5 was followed using the polymer obtained in Comparative Synthesis Example 1 in lieu of the polymer obtained in Synthesis Example 1 and the physical properties were measured. The results are also shown in Table 4.

COMPARATIVE EXAMPLE 9

The procedure of Example 4 or 5 was followed using 100 weight parts of the polyether polymer obtained in Comparative Synthesis Example 2 in lieu of the mixture of the vinyl polymer of Synthesis Example 1 and the polyether polymer of Comparative Synthesis Example 2, and the physical properties were measured. The results are also shown in Table 4.

REFERENCE EXAMPLES 1 AND 2

The procedure of Example 4 or 5 was followed using 100 weight parts of the vinyl polymer of Synthesis Example 1 and the vinyl polymer of Comparative Synthesis Example 1 in lieu of the mixture of the vinyl polymer of Synthesis Example 1 and the polyether polymer of Comparative Synthesis Example 2, and the physical properties were measured. The results are also shown in Table 4.

TABLE 4

|  | Ex. 4 | Ex. 5 | Compar. Ex. 7 | Compar. Ex. 8 | Compar Ex. 9 | Ref. Ex. 1 | Ref. Ex. 2 |
|---|---|---|---|---|---|---|---|
| Polymer of Synth. Ex. 1 | 50 | 25 |  |  |  | 100 |  |
| Polymer of Compar. Synth. Ex. 1 |  |  | 50 | 25 |  |  | 100 |
| Polymer of Compar. Synth. Ex. 2 | 50 | 75 | 50 | 75 | 100 |  |  |
| Viscosity (Pa · S) | 26 | 15 | 40 | 22 | 6 | 44 | 74 |
| M50 (MPa) | 0.24 | 0.26 | 0.20 | 0.24 | 0.29 | 0.18 | 0.10 |
| Tb (MPa) | 0.32 | 0.38 | 0.32 | 0.44 | 0.50 | 0.26 | 0.14 |
| Eb (%) | 77 | 94 | 94 | 119 | 119 | 84 | 69 |
| Gel fraction (%) | 95 | 94 | 91 | 91 | 93 | 95 | 78 |

TABLE 4-continued

|  | Ex. 4 | Ex. 5 | Compar. Ex. 7 | Compar. Ex. 8 | Compar Ex. 9 | Ref. Ex. 1 | Ref. Ex. 2 |
| --- | --- | --- | --- | --- | --- | --- | --- |
| Accelerated weathering | No abnormality | No abnormality | No abnormality | No abnormality | Dissolved | No abnormality | No abnormality |

By blending the polymer of Comparative Synthesis Example 2 with the polymer of Synthesis Example 1, the weathering resistance was improved. The use of the polymer of Synthesis Example 1 results in a lower viscosity and gives cured products higher in gel fraction as compared with the use of the polymer of Comparative Synthesis Example 1.

INDUSTRIAL APPLICABILITY

The curable composition of the present invention, which has the constitution mentioned above, adheres to various substrates firmly and tightly after curing and shows elastic properties and is useful particularly as an elastic adhesive. The composition of the present invention, when a crosslinkable silyl-containing vinyl polymer and a polyether polymer having at least one crosslinkable silyl group are combined therein, can become a curable composition excellent particularly in elongation and weathering resistance after curing.

What is claimed is:

1. A curable composition which comprises the following two components: (I) a vinyl polymer having at least one crosslinkable silyl group represented by the general formula (1) and having a weight average molecular weight-to-number average molecular weight ratio of less than 1.8 as determined by gel permeation chromatography, and (II) a polyether polymer having at least one crosslinkable silyl group or an epoxy resin;

$$-[Si(R^1)_{2-b}(Y)_b O]_m-Si(R^2)_{3-a}(Y)_a \quad (1)$$

wherein $R^1$ and $R^2$ each represents an alkyl group containing 1 to 20 carbon atoms, an aryl group containing 6 to 20 carbon atoms, an aralykl group containing 7 to 20 carbon atoms, or a triorganosiloxy group represented by the formula $(R')_3 SiO-$, in which R' represents a monovalent hydrocarbon group containing 1 to 10 carbon atoms and the three R's may be the same or different, and when there are two or more $R^1$ or $R^2$ groups, they may be the same or different; Y represents a hydroxy group or a hydrolyzable group and, when there are two or more Y groups, they may be the same or different; a represents 0, 1, 2 or 3; b represents 0, 1 or 2; and m represents an integer of 0 to 19; with the condition that a, b and m satisfy the relation $a+mb \geq 1$.

2. The curable composition according to claim 1, wherein the vinyl polymer to serve as component (I) is a (meth)acrylic polymer.

3. The curable composition according to claim 1, wherein the production method of the vinyl polymer to serve as component (I) comprises living radical polymerization.

4. The curable composition according to claim 1, wherein the production method of the vinyl polymer to serve as component (I) comprises atom transfer radical polymerization.

5. The curable composition according to claim 1, wherein component (I) has at least one crosslinkable silyl group represented by the general formula (1) at its molecular chain terminus.

6. The curable composition according to claim 1, wherein the vinyl polymer serving as component (I) and having at least one crosslinkable silyl group represented by the general formula (1) is obtained by the following steps of:

(1) producing a halogen-terminated vinyl polymer by subjecting a vinyl monomer to radical polymerization using an organic halide or a halogenated sulfonyl compound as an initiator and a transition metal complex as a catalyst;

(2) reacting said halogen-terminated vinyl polymer with an alkenyl-containing oxy anion for substitution of the halogen to thereby produce an alkenyl-terminated vinyl polymer; and (3) reacting the same with a hydrosilane compound having a crosslinkable silyl group represented by the general formula (1).

7. The curable composition according to claim 1, wherein the vinyl polymer serving as component (I) and having a crosslinkable silyl group represented by the general formula (1) is obtained by the following steps of:

(1) producing a vinyl polymer by subjecting a vinyl monomer to living radical polymerization; and (2) then reacting said vinyl polymer with a compound having at least two alkenyl groups having low polymerizability to thereby produce an alkenyl-terminated vinyl polymer, and reacting the terminal alkenyl group with a hydrosilane compound having a crosslinkable silyl group represented by the general formula (1) for conversion to a silyl-containing substituent.

8. The curable composition according to claim 1, wherein the epoxy resin serving as component (II) is a bisphenol A-based epoxy resin.

9. An elastic adhesive which comprises the curable composition according to claim 1.

10. The curable composition as defined in claim 1, wherein component (II) is a polyether polymer that consists essentially of a polypropylene oxide.

11. A sealing material which comprises the curable composition according to claim 1.

12. A pressure sensitive adhesive which comprises the curable composition according to claim 1.

13. The curable composition according to claim 2, wherein the production method of the vinyl polymer to serve as component (I) comprises living radical polymerization.

14. The curable composition according to claim 2, wherein the production method of the vinyl polymer to serve as component (I) comprises atom transfer radical polymerization.

15. The curable composition according to claim 3, wherein the production method of the vinyl polymer to serve as component (I) comprises atom transfer radical polymerization.

* * * * *